United States Patent [19]

Deschenes

[11] 4,159,899

[45] Jul. 3, 1979

[54] PRECLEANER ASSEMBLY

[75] Inventor: Charles L. Deschenes, N. Attleboro, Mass.

[73] Assignee: Fram Corporation, East Providence, R.I.

[21] Appl. No.: 827,924

[22] Filed: Aug. 26, 1977

[51] Int. Cl.² .......... B01D 45/12

[52] U.S. Cl. .......... 55/454; 55/456; 55/385 B

[58] Field of Search .......... 55/385 B, 396, 399, 55/449, 451, 454, 456, 457, 461

[56] References Cited

U.S. PATENT DOCUMENTS

| | | | |
|---|---|---|---|
| 612,207 | 10/1898 | Kincaid et al. | 55/457 |
| 1,461,630 | 7/1923 | Short et al. | 55/456 |
| 1,735,298 | 11/1929 | Pfeffer | 55/396 |
| 1,742,769 | 1/1930 | Kamrath | 55/451 |
| 1,931,193 | 10/1933 | Hawley | 55/396 |
| 3,362,155 | 1/1968 | Driscoll | 55/306 |
| 3,987,862 | 10/1976 | Lidstone | 55/385 B |

FOREIGN PATENT DOCUMENTS

| | | | |
|---|---|---|---|
| 496843 | 10/1953 | Canada | 55/457 |
| 18369 | 12/1907 | Norway | 55/396 |

*Primary Examiner*—Bernard Nozick

*Attorney, Agent, or Firm*—Ken C. Decker; William N. Antonis

[57] ABSTRACT

A precleaner assembly for the air intake system of a heavy duty vehicle ejects duct particles and other heavy material from the incoming air stream so that the heavy particles will not clog the normal vehicle air cleaner, thereby greatly increasing its life. The precleaner assembly includes an inlet which faces the direction of vehicle movement, so ambient air is rammed into the inlet of the precleaner. The rammed air is directed through turning vanes located in a diverging portion of the assembly to induce a vortex or spiral flow component to the fluid. Centrifugal force generated by movement of the dust particles in the spiral path causes the latter to be centrifuged radially outwardly with respect to the direction of movement of the flow stream. These heavy particles therefore are concentrated in the radial outermost portion of the flow stream, which is ejected from the assembly, so that the remaining portion of the flow stream will be relatively free of the heavy particles. This remaining portion of the flow stream is then communicated directly to the vehicle air cleaner.

9 Claims, 2 Drawing Figures

PRECLEANER ASSEMBLY

BACKGROUND OF THE INVENTION

This invention relates to a precleaner assembly for the air intake system of a heavy duty vehicle.

In order to assure satisfactory life of the vehicle air cleaner cartridge, it is necessary, particularly in heavy duty vehicles operated in dusty or dirty environments, to separate heavier particles from the incoming air stream before the latter is communicated to the air filter. Prior art precleaner assemblies have accomplished this separation of the heavier dust or dirt particles by providing a fin ring or turning vanes to induce spiral or vortex flow components into the incoming air stream. Movement of the dust particles in the spiral path generates centrifugal forces which urge the latter radially outwardly with respect to the flow stream, so that these particles are concentrated in the radial outermost portions thereof. This portion is then ejected, and the remaining portion of the flow stream saved for communication to the engine. However, the efficiency of precleaner assemblies of this type is dependent upon the pressure drop across the fin ring located within the structure and carrying the turning vanes. Prior art devices were dependent upon engine intake manifold vacuum to induce air flow through the vanes. However, performance of this type of air cleaner is marginal at best, because the relatively low pressure differential across the vanes induces a very weak vortex flow of the fluid, thus inhibiting proper separation of the dust particles.

The present invention increases the efficiency of the precleaner assembly by taking advantage of the ram air effect caused by the moving vehicle to increase the pressure level of the incoming air flow. Then, as the air flow moves across the fin ring carrying the turning vanes, the diameter of the precleaner housing increases, to thereby increase the flow area and to rapidly decrease the pressure level of the incoming fluid. These two factors combine to greatly increase the pressure drop across the turning vanes, thereby causing the latter to induce a much stronger vortex than was possible in prior art devices. The stronger vortex or spiral flow action increases the centrifugal forces tending to urge the dust particles radially outwardly with respect to the flow path, thus concentrating a large percentage of the particles in the radial outwardmost portion of the flow stream, which is ejected from the housing.

SUMMARY OF THE INVENTION

Therefore, an important object of my invention is to provide a precleaner assembly for the air intake system of a heavy duty vehicle which is much more efficient than prior art devices in separating dust particles from the incoming air stream.

Another important object of my invention is to provide a precleaner assembly with takes advantage of the ram effect of being located on a moving vehicle to compress the incoming air stream to thereby increase the pressure drop across the turning vanes to thereby induce a much stronger spiral or vortex flow component in the flow stream, thereby increasing substantially the forces concentrating the dust particles in the radially outermost portion of the flow stream.

Still another important object of my invention is to provide a tangential ejector through which the radially outermost portion of the flow stream passing through the precleaner assembly is ejected, and to take advantage of the low pressure zone created on the side of the precleaner assembly opposite the direction of movement of the vehicle to assist in drawing air and concentrated particulate matter through the tangential ejector and out of the precleaner assembly.

DETAILED DESCRIPTION

Figure 2:
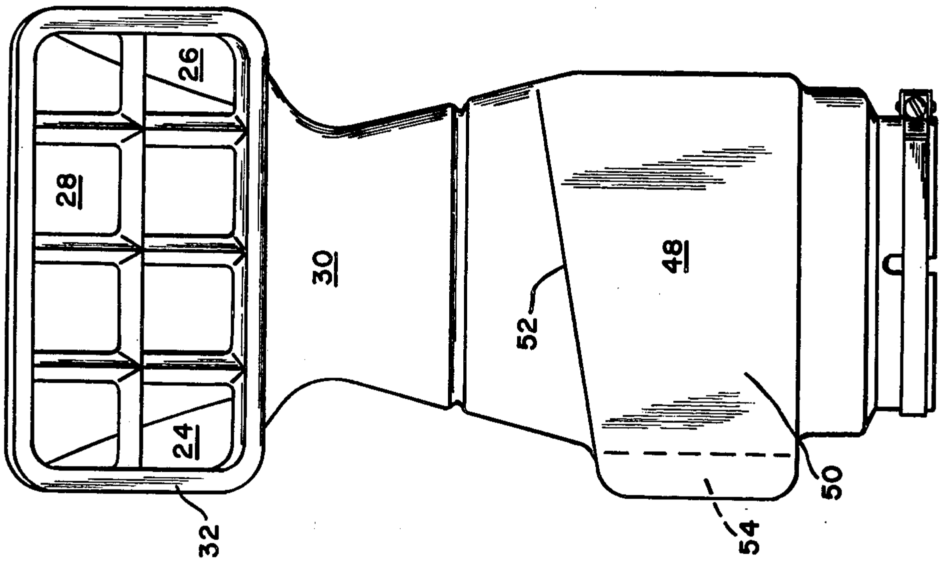
FIG. 2 is a side elevational view of the precleaner assembly illustrated in FIG. 1.
Figure 1:
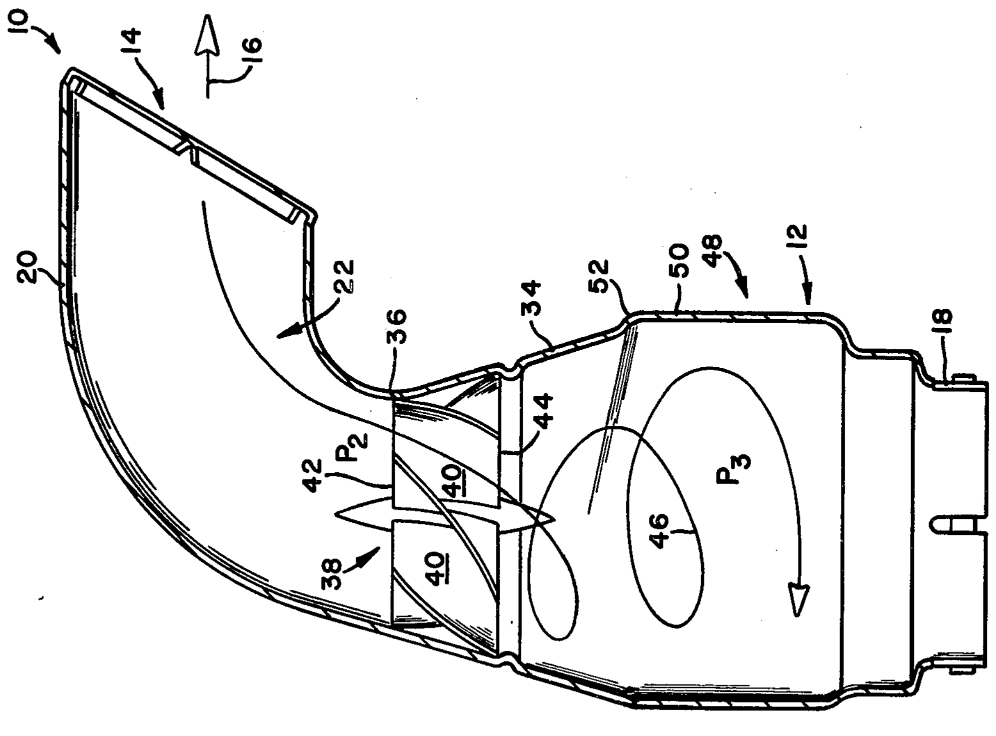
FIG. 1 is a longitudinal cross-sectional view of a precleaner assembly made pursuant to the teachings of my present invention.

Referring now to the drawings, a precleaner assembly for an air intake system of a heavy duty vehicle is generally indicated by the numeral 10 and includes a housing 12 having an air inlet generally indicated by the numeral 14 which faces parallel to the direction of movement of the vehicle generally indicated by the arrow labeled by the numeral 16, and an outlet 18. Preferably, the inlet 14, at least, is mounted higher than the uppermost portion of the vehicle, so that the inlet 14 may receive unobstructed air flow as the vehicle is operated. The outlet 18 receives a conventional air intake pipe (not shown) which communicates the precleaner assembly 10 with the vehicle air cleaner located adjacent the intake manifold.

The housing 12 includes a converging inlet section 20 which includes a right-angle bend at 22 so that the generally horizontal air flow communicated to the inlet 14 is turned approximately 90° so that it can be directed into the aforementioned air intake pipe (not shown). The portion 20 includes a pair of converging side walls 24, 26, and an upper and lower walls 28, 30, which provide a flow path of decreasing flow area from the inlet 14. The inlet 14 is covered with a decorative, latticework structure 32.

The housing 12 also includes an annular diverging section 34 which joins with the converging section 20 to define a throat 36. The flow area presented by the housing 12 to the flow stream is smallest at the throat 36, since, as pointed out hereinabove, the portion 20 has converging walls in which the flow area presented to the flow stream continually decreases. Conversely, the diverging section 34 presents a gradually increasing flow area to the flow stream. A conventional, fin ring 38 comprising turning vanes 40 has an entrance indicated by the numeral 42 which is located at the throat 36, and an exit 44 which is located in the diverging portion 34 of the housing 12. As is well known to those skilled in the art, air flow through the fin ring 38 comprising the turning vanes 40 will induce a spiral or vortex component to the air flow, as generally indicated by the arrow 46.

The housing 12 further includes a tangential ejector generally indicated by the numeral 48 which comprises a duct which extends circumferentially around the housing, as best illustrated in FIG. 2, through an arc of just over 180 degrees. The ejector 48 includes an outer wall 50 having a tapered upper portion 52 which blends with the diverging portion 34 of the housing 12 to assure smooth, unobstructed flow into the ejector mechanism 48. As can best be seen in FIG. 2, the wall 50 projects in a radially outwardly direction with respect to the center line of the housing, and terminates in an outlet 54 which faces in a direction opposite to the direction faced by the inlet 14. As can also be seen in FIG. 2, the tapered portion 52 of the wall 50 also tapers downwardly viewing FIG. 2.

MODE OF OPERATION

As discussed hereinabove, the precleaner assembly 10 is mounted on the vehicle so that the inlet 14 is above the highest portion thereof, so that it may receive unobstructed air flow when the vehicle is moved in the direction indicated by the numeral 16. The ram effect caused by moving the precleaner assembly 10 in the direction of arrow 16 forces ambient air through the inlet 14. Because of the converging side walls, the ram air is compressed to a level far higher than atmospheric at the throat 36. However, beginning at the throat 36, the flow stream enters the diverging section 34, in which an increasingly larger flow area is presented to the flow stream. The increased pressure at the throat 36 caused by the ram effect of the incoming air, and the diverging section 34 which increases the flow area to thereby reduce the air pressure, cooperate to provide a much larger pressure drop across the fin ring 38 than was possible in prior art devices in which the air flow was sucked through the fin ring 38 solely by engine manifold vacuum. Movement of the air through the turning vanes 40 induces a spiral or vortex component to the air flow, as indicated by the arrow 46. The dust particles which are in the air stream, being relatively heavy, are centrifuged radially outwardly with respect to the center line of the housing, due to centrifugal forces exerted on the dust particles through movement of the latter in the spiral path. Consequently, these particles will be concentrated in that portion of the flow stream adjacent to the wall of the housing 12. As the flow stream continues to move towards the outlet 18, the radial outermost portion of the flow stream enters the tangential ejector 48, and is directed by the latter to the outlet 54. It will be noted that the outlet 54 faces in a direction opposite to that faced by the inlet 14. The movement of the precleaner assembly 10 on the vehicle, in which air is rammed through the inlet 14, generates a higher pressure level on the side of the precleaner assembly 10 in which the inlet 14 is located. Similarly, the movement of the precleaner assembly 10 relative to the ambient air stream creates a low pressure zone on the side of the precleaner assembly opposite the inlet 14. The outlet 54 is communicated to this low pressure zone which tends to draw the particle-laden air adjacent the wall of the housing 12 through the ejector 48 and back into the ambient atmosphere, thus providing a relatively clean flow stream for communication through the outlet 18 and into the vehicle air cleaner.

I claim:

1. In a vehicle, a precleaner assembly for the engine air intake system for separating particulate material from the entering air comprising a housing having an inlet and a outlet facing a direction other than the direction faced by said inlet, said housing defining a flow path between said inlet and said outlet and having a converging conduit section having a bend communicated with the inlet and turning the air communicating through the inlet into the direction faced by the outlet, and a diverging conduit section communicated with an outlet conduit section, wherein the entrance to said diverging conduit section presents a smaller cross-sectional area than the cross-sectional area at the exit of said diverging conduit section so that air communicated through the diverging conduit section is expanded, the exit from the converging conduit section presenting a smaller cross-sectional area than the entrance to the converging conduit section so that air communicated through the converging conduit section is compressed, the exit from the converging conduit section and the entrance to the diverging conduit section joining to define a throat whereby fluid entering said inlet is compressed by said converging conduit section to a maximum pressure level at said throat, means in said diverging conduit section for turning the fluid into a spiral path so that centrifugal forces generated by movement of the particulate material in said spiral path urge said particulate material toward the wall of said housing, said turning means having an inlet, the inlet of said turning means being located substantially at said throat, and means for ejecting from said outlet conduit section the portion of the fluid adjacent the wall of said outlet conduit section in which said particulate material is concentrated, the rest of said air being communicated in an axial direction to said outlet.

2. The invention of claim 1:
wherein said bend is substantially a right angle bend.

3. The invention of claim 1:
wherein said inlet faces the direction of forward movement of the vehicle.

4. The invention of claim 1:
wherein said inlet faces the direction of forward movement of the vehicle and said outlet faces a direction substantially perpendicular to the direction of forward movement of the vehicle whereby said bend is substantially a right angle bend.

5. The invention of claim 1:
wherein said turning means comprises nonrotatable vanes located in said diverging section.

6. The invention of claim 1:
wherein said ejecting means comprises a duct extending tangentially with respect to said housing.

7. The invention of claim 6:
wherein said duct terminates in an opening facing opposite to the direction said inlet faces.

8. The invention of claim 6:
wherein said duct includes an outer wall having a tapered portion on one edge thereof, said tapered edge blending with the wall of the housing to provide a smooth, unobstructed transition to said ejecting means.

9. The invention of claim 6:
wherein said inlet faces the direction of forward movement of the vehicle and said outlet faces a direction substantially perpendicular to the direction of forward movement of the vehicle whereby said bend is substantially a right angle bend, and said duct terminates in an opening facing in a direction opposite to the direction of forward movement of the vehicle.

* * * * *